Patented Dec. 26, 1950

2,535,875

UNITED STATES PATENT OFFICE 2,535,875

PLANT GROWTH REGULANTS

William D. Stewart, Yonkers, N. Y., assignor to The B. F. Goodrich Company, New York, N. Y., a corporation of New York No Drawing. Application September 3, 1947, Serial No. 772,003

11 Claims. (Cl. 71—2.7)

This invention relates to synthetic compositions which produce histogenic and morphogenic changes in living plants, and more specifically pertains to derivatives of propionic acid which are capable of altering the growth characteristics of plants.

The art of controlled modification of plant growth by the application of synthetic growth regulants has aroused considerable interest in recent years. Many materials have been discovered which when applied to plant structure in minute amounts act as growth regulants. For example, chemical compounds have been found which stimulate and initiate root growth, which stimulate the growth of the abscission cells of fruit stems, which, at increased dosages retard the growth of the abscission cells of fruit stems, which stimulate stem bud growth, which stimuate seed germination, which promote callus formation, and which function in similar ways as evocators of plant histogenesis and morphogenesis.

Among the known synthetic plant growth regulants are for example, indoleacetic acid, indolebutyric acid, indolepyruvic acid, naphthalene acetic acid, naphthalene butyric acid, phenyl acetic acid, 2,4-dichlorophenoxy acetic acid, naphthalene glycolic acid and others. While these materials have been widely used they have not been completely satisfactory and hence there is a great need in the art of plant propagation for improved growth regulants. The known regulants and growth initiators are less effective than is desired in various aspects of plant propagation, for example, in the rooting of fruit tree cuttings to propagate desirable somatic characteristics of plants which cannot be transferred by the use of seed, in increasing the percentage of rooted cuttings of those plants now normally produced from cuttings instead of seed, in reducing the number of set fruit on heavy bearing fruit trees, in producing higher setting of fruit on light setting trees and bushes, in preventing the premature fall of fruit and in producing seedless or near seedless fruits by inducing parthenogenesis.

Moreover, few of the known plant growth regulants can be synthesized on factory production scale so as to be either available in large enough quantities to supply the demand or sufficiently low in price to attract the attention of prospective users. Also, those which are available in sufficient quantity and at a marketable price to make their use economically feasible do not have as wide a range of tolerance of application as is desirable, for the difference between the effective concentration and that which causes undesirable injury to the plant is relatively small in many instances. Consequently, the use of many of the regulants that are now available not only requires the attention of a highly skilled technically trained supervisor during application of the materials but also requires the precise measuring of small quantities in the field with precision usually available only in the chemical laboratory. Accordingly, the precision and supervision required to employ successfully the available regulants and to achieve the maximum benefits of their use often prevent large scale field application by the average prospective user.

I have discovered a class of growth regulants which are exceedingly successful in the art of plant propagation for altering the growth characteristics of plants and which are capable of being successfully applied by the average person possessing no special skill. These new materials are beta-oxy and beta-thio propionic acids and their hydrolizable derivatives such as the salts, esters and amides. These materials function as evocators of histogenesis and morphogenesis in diverse manners to alter the growth characteristics of many types of plants.

The preferred compounds of this new class of growth regulants are those which have the following general formula:

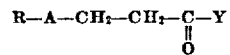

where R is hydrogen or an aliphatic or alicyclic hydrocarbon radical, A is a chalcogen atom whose atomic weight is less than 33 and Y is the hydroxyl radical (in which event the compound is an acid), an oxy-hydrocarbon radical (in which event the compound is an ester), an amido or hydrocarbon-substituted amido radical (in which event the compound is an amide) or an oxy-ammonium or oxy-metallic group (in which event the compound is a salt). More specifically, R may be hydrogen, alkyl, alkenyl, cycloalkyl, cycloalkenyl, or other aliphatic or alicyclic hydrocarbon radical, preferably one containing from 1 to 12 carbon atoms; A may be oxygen or sulfur; and Y may be the hydroxyl group or such oxy-hydrocarbon group as alkoxy, alkenoxy, cycloalkoxy, aryloxy, alkaryloxy, aralkoxy or the like, or an amido or hydrocarbon-substituted amido radical where one or both of the hydrogens is replaced by alkyl, alkenyl, aryl, alkaryl, aralkyl, etc., or an oxy-ammonium group (—O—NH₄) or an oxy-metallic group of the formula —O—M where M is a metal such as sodium, potassium, magnesium, zinc, iron or the like. All the propionic acid derivatives in the above class (where Y is not OH) are capable of being converted to the free acid through hydrolysis involving one molecule of water.

These compounds can be readily and economically prepared by several methods. For example, many of the beta-oxy and beta-thio propionic acids may be prepared by reacting an alkali metal alcoholate or mercaptide with beta-chloro or beta-bromo propionic acid. The beta-thio compounds can also be prepared by reacting acrylonitrile with a mercaptan and then converting the resulting nitrile to the carboxylic acid. A most convenient and economical method of preparation of these acids involves the use of beta-propiolactone, obtainable from ketene and formaldehyde. Thus, beta-propiolactone may be hydrolyzed to give beta-hydroxy propionic acid; it may be reacted with sodium sulfide to give beta-mercapto propionic acid, as is more fully disclosed in the copending application of Thomas L. Gresham, Serial No. 620,657, filed October 5, 1945, now Patent No. 2,449,989, issued October 28, 1948; it may be reacted with aliphatic mercaptans to give beta-alkyl-thio propionic acids, as is more fully disclosed in the copending application of Gresham et al. Serial No. 620,660, filed October 5, 1945, now Patent No. 2,449,992, issued October 28, 1948, and it may be reacted with alcohols to give beta-alkoxy propionic acids as disclosed in U. S. Patent 2,352,641 to Frederick E Küng. The derivatives of the beta-oxy and beta-thio propionic acids may be prepared from the acids by methods well known to the art.

Beta-oxy propionic acids which are useful according to my invention include such beta-alkoxy acids as beta-methoxy propionic acid, beta-ethoxy propionic acid, beta-n-propoxy propionic acid, beta-isopropoxy propionic acid, beta-n-butoxy propionic acid, beta-tertiary-butoxy propionic acid, beta-n-amyloxy propionic acid, beta-isoamyloxy propionic acid and the like and such other beta aliphatic or alicyclic hydrocarbon-oxy acids as beta-allyloxy propionic acid, beta-methallyloxy propionic acid, beta-(3-methyl-3-hexenyloxy) propionic acid, beta-(2-methyl-1-butenyloxy) propionic acid, beta-(cyclohexyloxy) propionic acid and the like. Beta-hydroxy propionic acid (R is hydrogen) also has growth promoting properties and is useful in the same manner as the beta-(hydrocarbon-oxy) acids.

The corresponding beta-thio compounds, such as beta-mercapto propionic acid (where R is hydrogen), S-methyl beta-mercapto propionic acid, S-ethyl beta-mercapto propionic acid, S-n-propyl beta-mercapto propionic acid, S-n-isopropyl beta-mercapto propionic acid, S-n-octyl beta-mercapto propionic acid, S-cyclohexyl beta-mercapto propionic acid, S-n-lauryl beta-mercapto propionic acid, S-n-decyl beta-mercapto propionic acid, S-allyl beta-mercapto propionic acid and others are also useful growth regulants.

Esters of the above beta-oxy and beta-thio propionic acids which are useful according to my invention include such alkyl esters as the methyl, ethyl, n-propyl, isopropyl, n-butyl, isobutyl, tertiary butyl, amyl and hexyl esters and the like; such aryl esters as the phenyl, naphthyl, tolyl esters and the like; such aralkyl esters as the benzyl, phenethyl, and the like; and such unsaturated aliphatic esters as the allyl, methallyl, 3-methyl-3-hexenyl, 2-methyl-1-butenyl and others.

Other beta-oxy and beta-thio propionic acid derivatives which are useful growth regulants are the amides of any of the above acids, such as for example the unsubstituted amides, mono- and diethyl amides, mono- and di-isobutyl amides, mono- and di-cyclohexyl amides, mono- and diphenyl amides, benzyl amides and phenethyl amides and the like.

The compounds of this invention may be employed in numerous ways to stimulate or modify the growth characteristics of plant structures. For example, they may be applied to seeds to stimulate germination or to stimulate root and stem development; they may be applied to tubers to promote root development and stem bud growth; they may be applied to cuttings and transplants to stimulate root formation, or they may be applied to blossoms to induce parthenogenesis. Also, they may be applied to intact plants to retard blossoming, to stimulate the growth of abscission cells to produce premature dropping of blossoms and set fruit, or by varying the manner of treatment may also modify the growth of abscission cells to prevent drop of mature fruit. Thus, these compounds may be capable of producing a variety of desirous modifications of plant growth which are exceedingly useful and beneficial to the operators of greenhouses, orchards and nurseries.

In the application of these compounds to produce these growth modifications different compositions may be employed. In general, aqueous dispersions or aqueous solutions depending on whether or not the compound is water-soluble will be found most desirable. The dispersions will of course contain a dispersing or wetting agent and the solutions also preferably contain wetting agents to facilitate the spreading of the solution. Such wetting and dispersing agents as, for example, those typified by the following general classifications: sodium and potassium salts of fatty acids known as soft and hard soaps; salts of disproportionated abietic acid known as rosin soaps; salts of the hydroxy aldehyde acids present in seaweed known as algin soaps; alkali-casein compositions; water-soluble lignin sulfonate salts; long chain alcohols usually containing 10 to 18 carbon atoms; water-soluble salts of sulfated fatty alcohols containing 10 to 18 carbon atoms; water-soluble salts of sulfated fatty acid amides; water-soluble esters of sulfated fatty acids; water-soluble alkyl sulfonates having on the average of 16 carbon atoms in the alkyl group; water-soluble aryl sulfonates; water-soluble alkyl aryl sulfonates; water-soluble aralkyl sulfonates; water-soluble sorbitan mono-laurate, palmitate, stearate and oleate; and others may be advantageously employed in aqueous compositions employing this new class of growth regulants. These dispersing and wetting agents are sold under numerous trade names and may be either pure compounds or be mixtures of compounds of the same general group. The aqueous dispersions and solutions may also contain adhesives or stickers to prevent the removal of the stimuli by weathering. A material which will function as an excellent sticker or adhesive and may be employed advantageously is the aqueous dispersion of polymeric organic polysulfides which on drying forms a discontinuous, translucent, rubbery, microscopic film. An example of this type of sticker is the aqueous dispersions of polymeric ethylene polysulfide prepared in the presence of a salt-stable emulsifying agent.

The compounds may also be applied in admixture with other diluents either as pastes or dusts. The pastes may be prepared with any inert vehicle while the dusts are usually prepared with some finely-divided inert material such as talc, flour, fuller's earth, clay or other pulverulent materials, soluble in water.

In all their various applications, these plant growth modifying or stimulating compositions are applied to plant structures which are capable of growth, i. e., plant structures containing living cells and such plant structures containing dormant cells as tubers and seeds. In the application of these growth regulants to tubers and seeds, it is not known whether the action of the material is to modify the tuber or seed or to alter the growth characteristics of the plant which results from the tuber or seed. For the purposes of this invention, it is intended that the use of the term "plant" includes the living as well as dormant plants.

The following examples illustrate the ability of these compositions to stimulate the growth of various plant structures and further illustrates the numerous compositions in which these compounds can be successfully employed. In many of the examples, the results obtained from the use of indolebutyric acid, a growth promoting material which has enjoyed considerable commercial success, are given merely for purposes of comparison.

EXAMPLE I

In an assay to determine the growth promoting activity of members of the class of beta-oxy and beta-thio propionic acids and their derivatives hereinbefore defined, about 0.05 gram of each of the materials listed in Table I were mixed with one gram portions of lanolin. Some of the mixture was rubbed on petioles and some on the stems of young tomato plants. The treated plants were observed over a period of several days for nastic curvature and morphogenic changes. This is a well known method for the determination of the index of activity of plant stimulating substances. The results of this assay together with the results of the use of indolebutyric acid in the same manner, and the results of the use of lanolin alone as a check are listed in Table I below.

Table I
STIMULANT ACTIVITY ON YOUNG TOMATO PLANTS

| Composition | Material Employed | Response Time After Treatment | |
|---|---|---|---|
| | | 24 hours | 72 hours |
| A | Methyl (beta-methoxy) propionate | None Apparent | Slight Epinasty. |
| B | Beta-isopropoxy propionic acid | Strong Epinasty—Slight injury | Severe Injury.[1] |
| C | Isopropyl (beta-isopropoxy) propionate | Strong Epinasty | Strong Epinasty. |
| D | Ter. butyl (beta ter. butoxy) propionate | None Apparent | Slight Epinasty. |
| E | Beta ter. butoxy propionic acid | Injury | Injury.[1] |
| F | Ethyl (beta-ethoxy) propionate | None | Slight Epinasty. |
| G | Indolebutyric acid | Mild Epinasty | Good Epinasty. Good Curvature. |
| H | 8-n-octyl beta-mercapto propionic acid | | Mild Epinasty. |
| I | Lanolin alone for control | None | None. |

[1] Concentration of these materials obviously too high. A lesser amount per gram of lanolin produces strong epinastic response with no injury.

The following examples illustrate the practical value of the stimulant activity of these propionic acid derivatives.

EXAMPLE II

Three inch terminal cuttings of Chrysanthemum, varieties Mary L. Hall and Little America, were immersed for 30 seconds in aqueous solutions containing members of the class of substituted propionic acids defined above. The treated portion of the cuttings were stuck in wet sterilized sand and inspected after 11 days for rooting. The aqueous solutions were prepared by dissolving a quantity of the growth stimulating compound sufficient to give the concentration desired, in an aqueous solution containing 0.025% by weight of a wetting agent composed primarily of sodium lauryl sulfate. The concentrations employed and the rooting initiation is shown for typical members of this new class of plant stimulants in Table II. Ten cuttings were employed for each composition shown in the table.

Table II
ROOTING INITIATION OF CHRYSANTHEMUM CUTTINGS
[Variety—Mary L. Hall]

| Composition | Material Employed | Concentration, mg./c. c. | 11 Day Exposure to Wet Sand Rooting Response |
|---|---|---|---|
| A | Control 0.1% Wetting Agent | | No Roots. Poor Callus. |
| B | Beta-ethoxy propionic acid | 1.0 | 10 heavily rooted. |
| C | | 0.5 | Do. |
| D | | 0.25 | Do. |
| E | Beta-methoxy propionic acid | 1.0 | Do. |
| F | | 0.5 | Do. |
| G | | 0.25 | Do. |

All the cuttings in the bench rooting trials where compositions B to G were employed were uniformly callused.

*Table II—Continued*

ROOTING INITIATION OF CHRYSANTHEMUM CUTTINGS—Continued

[Variety—Little America]

| Composition | Material Employed | Concentration, mg./c. c. | 11 Day Exposure to Wet Sand Rooting Response |
|---|---|---|---|
| H | Ethyl (beta-hydroxy) propionate | 1.0 | 5 heavily, 5 light rooted } Good callus but not uniform. |
| I | | 0.5 | 7 heavily rooted |
| J | | 0.25 | 8 heavily rooted |
| K | Beta-methalloxy propionic acid | 1.0 | 10 heavily rooted, Uniformly calloused. |
| L | | 0.5 | Do. |
| M | | 0.25 | Do. |

Ten cuttings were immersed in an aqueous dispersion of 0.2 mg./c. c. of indolebutyric acid prepared in the same manner as described above. Nine of the cuttings rooted. A few of the nine rooted cuttings had heavy roots and the remaining cuttings had medium to light roots. The tenth cutting had no roots at all. All but three of the compositions in Table II were superior to the indolebutyric acid composition as root initiators for chrysanthemum. These three, the compositions containing ethyl (beta-hydroxy) propionate were substantially equal to the indolebutyric acid composition. Chrysanthemum cuttings which are dipped in water alone and stuck in moist sterilized sand take from four to six weeks to root and even then only about 50% root. Thus, even the above compositions showing the least activity will produce desirable uniform rooting in a relatively short time.

EXAMPLE III

Four inch terminal cuttings of yew (Taxus), 20 cuttings per composition, were immersed for 30 seconds in aqueous solutions of the compounds at the concentrations indicated in Table III.

*Table III*

ROOTING INITIATION OF YEW (TAXUS) CUTTINGS

[54 days after treatment.]

| Composition | Material Employed | Concentration, Mg./c. c. | Number Rooted |
|---|---|---|---|
| A | Beta-ethoxy propionic acid | 1.0 | 1 |
| B | | 0.5 | 2 |
| C | | 0.25 | 1 |
| D | Beta-methoxy propionic acid | 1.0 | 5 |
| E | | 0.5 | 2 |
| F | | 0.25 | 1 |
| G | Indolebutyric acid | 1.0 | None |
| H | | 0.5 | None |
| I | | 0.25 | None |

The cuttings treated with compositions A through F which rooted had exceedingly heavy uniform root formation.

The excess aqueous solutions on the cuttings was allowed to drain off, and the treated cuttings were stuck in sterilized wet sand. The cuttings were watered the following day. These hardwood cuttings were removed from the sand after 54 days and the results of the various treatments were noted. Twenty yew cuttings immersed in an aqueous solution of indolebutyric acid were used for purpose of comparison. The results of these bench rooting trials are recorded in Table III.

EXAMPLE IV

Subterminal cuttings of privet (Ligustrum) were immersed in aqueous solutions containing 0.125 mg. of beta-methalloxy-propionic acid, 0.25 mg. of beta-methalloxy-propionic acid, 0.5 mg. indolebutyric acid, 1.0 mg. indolebutyric acid per cubic centimeter respectively. Twenty cuttings were immersed in each solution and stuck in sterilized wet sand after the excess aqueous solutions had drained off. After twenty-five days in the wet sand 14 of each of the twenty cuttings immersed in the beta-methalloxy-propionic acid solutions had rooted while only 12 of those immersed in the indolebutyric acid solution containing 0.5 mg./cc. had rooted and only 4 of those immersed in the indolebutyric acid solution containing 1.0 mg./cc. had rooted. It is apparent that indolebutyric acid at its higher concentration was not as effective as beta-methalloxy-propionic acid.

EXAMPLE V

Cuttings of three "hard to root" woody plants were immersed in aqueous solutions of beta-methalloxy-propionic acid and indolebutyric acid. These aqueous solutions contained 0.025% by weight of a wetting agent containing primarily sodium lauryl sulfate as the active agent. The cuttings employed for each test concentration were 15 fully leaved apple (Var. Baldwin) cuttings, 3 to 4 inches long, of the current, fast growing terminal shoots; 20 fully leaved holly (*Ilex opaca*) cuttings, 2 to 3 inches long, of the current, vigorous terminal shoots; and 15 rose (assorted tea roses) cuttings 3 to 4 inches long, of the terminal shoots. The concentrations of the materials employed together with the results obtained are tabulated in the following tables:

*Table IV*

15 ASSORTED TEA ROSE CUTTINGS

| Composition | Active Material Employed | Concentration, Mg./c. c. | Days after Treatment | | | | |
|---|---|---|---|---|---|---|---|
| | | | 22 | | 35 | | |
| | | | No. Alive | No. Calloused | No. Alive | No. Calloused | No. Rooted |
| A | Beta-methalloxy-propionic acid | 0.250 | 12 | 12 | 6 | 6 | 1 |
| B | Indolebutyric acid | 0.25 | 6 | 5 | 3 | 3 | 0 |

Table V
15 APPLE CUTTINGS, VARIETY—BALDWIN

| Composition | Active Material Employed | Concentration, Mg./c. c. | Days after Treatment | | |
|---|---|---|---|---|---|
| | | | 22 | 63 | |
| | | | No. Calloused | No. Calloused | No. Rooted |
| A | Beta-methalloxy-propionic acid | 0.125 | 11 | 13 | 2 |
| B | Indolebutyric acid | 0.20 | 11 | 13 | 0 |

Table VI
20 HOLLY CUTTINGS (ILEX OPACA)

| Composition | Active Material Employed | Concentration, Mg./c. c. | Days after Treatment | | |
|---|---|---|---|---|---|
| | | | 62 | 144 | |
| | | | No. Rooted | No. Rooted | No. Alive |
| A | Beta-methalloxy-propionic acid | 0.25 | 2 | 6 | 12 |
| B | Indolebutyric acid | 0.20 | 0 | 3 | 5 |

EXAMPLE VI

The terminal two inches of thirty-three pachysandra cuttings were immersed in an aqueous solution containing 0.25 gram of beta-methalloxy-propionic acid per liter and a like number of cuttings were immersed in an aqueous solution of indolebutyric acid containing 1 gram per liter. After the excess solution had drained from the cuttings, the cuttings were stuck in wet sterilized sand. In 25 days 21 of the cuttings treated with beta-methallyloxy-propionic acid had rooted while only 10 cuttings treated with indolebutyric acid had rooted. When a like number of cuttings were merely immersed in water and subjected to the same bench rooting trials, only 8 cuttings rooted.

EXAMPLE VII

Pachysandra cuttings two inches long were treated with solutions of the S-n-octyl, S-n-lauryl and S-n-decyl-beta-mercapto propionic acids, each solution containing 0.2 gram of the beta-mercapto propionic acid per liter. In the bench rooting trials employing each of the mercapto propionic acids named, forty pachysandra cuttings were used. The trials were conducted as in Example VI. In 21 days 50% or more of the cuttings treated with each of the above compounds had heavy uniform rooting with numerous primordia. The callousing on all cuttings was excellent.

An additional example of the utility of my compositions is illustrated by their ability to reduce the number of blossoms on fruit trees. The thinning is believed to be accomplished by the stimulation of the abscission cells of the blossom stem by the hormone-like activity of the compounds. The thinning of fruit blossoms is extremely desirous for fruit trees which normally have a heavy fruit set either because of self pollenization or otherwise, for, if the fruit set is heavy, the tree will bear only periodically, usually every other year and the years of heavy production not only results in a large quantity of small or undersized fruit but also results in limb damage because of the excess weight of the fruit. Orchard operators have attempted to overcome this heavy setting of fruit by hand thinning of the set fruit which is not only slow but relatively expensive. Thus, the premature removal of some of the blossoms by the application of a small amount of a material would be very useful. The following example illustrates the blossom thinning ability of these new growth stimulants.

EXAMPLE VIII

Peach trees, variety Hale Haven, and apple trees, variety Greening, were sprayed with an aqueous solution containing 20 P. P. M. of beta-methalloxy-propionic acid and 0.125% by weight of sodium lauryl sulfate. The spray was applied at 90 pounds pressure at full bloom employing a pressure sprayer charged with carbon dioxide. To determine the effectiveness of the spray application, the blossoms on the trees to be treated were counted. One-half of the blossoms on the tree were sprayed and the branches which held treated blossoms were tagged. The air temperature during spraying was 65° F. and rain fell about 3 hours after the spraying. In spite of the fact that blooming was spread over about 3 weeks, the set fruit on the treated portions of the peach trees was about 23% of the original blossoms while on the untreated portions, the set fruit averaged about 35%. The apple trees had only 27% set on the treated portions and 40% on the untreated portions. The set fruit on the treated portions indicate that the thinning was adequate for by hand thinning the set fruit which is allowed to remain on the trees is about 25% of the blossoms.

These growth stimulants have numerous other uses. For example, when seeds and tubers are treated with aqueous solutions of such materials as beta-ethoxy-propionic acid, ethyl (beta-ethoxy) propionate, beta-methalloxy-propionic acid, methallyl (beta-methalloxy) propionate in concentrations varying from a concentration as low as 0.125 gram per liter to about one gram per liter or higher the root system of the resulting plants are much more prolific than those resulting from untreated seeds and tubers. A further example of the utility of these growth stimulants is illustrated by the ability of these materials to initiate root growth of plants after transplanting. For plants whose roots have been dipped into aqueous solutions of the regulants or in dusts prepared by incorporating the evocator with diatomaceous earths, talc, ordinary soil, and the like, and planted in the usual manner, produce a more prolific root system in less time than untreated plants will and consequently are not set back in growing to the same degree that untreated plants are.

The use of these growth stimulants in concentrations above about 20 grams per liter or in excess of about 2% by weight sometimes produces severe injury to the plant structure. Accordingly, when these growth regulants are applied to plants by means of compositions containing these materials in concentrations of 5% or more by weight, the injury, in many instances, may be so severe as to cause the death of the plants treated which is desirable in many instances as in weed killing. Just how these materials cause the ultimate death of the plants is not completely understood, but it is believed that the presence of the greater amount of the plant regulants alters the metabolic processes of the plant so that the dominance of either anabolic or katabolic processes may lead to the death of the plant.

Although the major portion of the description of the utility of these beta-oxy and beta-thio propionic acids and derivatives of these acids has been directed to the altering of the growth characteristics of portions of the plant structure in such a manner as to promote the propagation of plants, it is not intended that the invention shall be so limited, for, as stated above, the materials may be employed to alter the physiology of the plant in such a manner as to kill the plants. In both cases the application of these materials alters growth characteristics of plants. Accordingly, the effect that these materials have on plants will be referred to in the appended claims as "altering the growth characteristics" of plants.

In the above examples, the concentration of the active ingredients in the compositions which were employed as growth stimulants was in the range of 0.002% to about 0.1% by weight. Although these concentrations are considered the optimum concentrations for the purposes for which they were used, the concentration of the active ingredient can be varied from about 0.002% to about 1% for growth stimulation without any deleterious effects. Thus, these growth stimulants have a wide range of tolerance in their application and can be safely employed without any special technical skill.

The effectiveness of the compounds of this invention will vary according to their individual characteristics, according to the type of plant structure treated and according to the purpose of the treatment. For example, a different concentration may be required for one variety of plant than required for another and the concentration required for root initiation may be different from that required for root stimulation. Also, the concentration required for antidrop treatment, while generally similar, may not be the same as that required to produce parthenogenesis. A further example of the varied activity of these compounds is illustrated by the effective concentration to cause the death of plants, for, in general, while 2 to 5% of these materials are necessary to kill plants, compositions containing only 0.5% by weight of S-n-octyl, S-n-lauryl and S-n-decyl beta-mercapto propionic acids will cause the ultimate death of such plants as crab grass, carrot, Spanish needle and burdock in 10 to 14 days although they did not kill blue grass. Those skilled in the art having these factors in mind and noting the results of the above examples and the tendencies indicated therein, will be able to determine conditions most suitable in any given case. In any instance the concentration required to achieve the desired results will fall within the range of concentrations given above.

To those skilled in the art many widely differing embodiments of the invention may become apparent. Accordingly, although I have disclosed specific examples of the utility of specific members of this new class of growth regulants, I do not thereby desire or intend to limit myself solely thereto, for as previously stated the vehicle and the amount of regulant employed may be varied and other materials of the class having equivalent physiological properties may be employed if desired without departing from the spirit and scope of the invention as defined in the appended claims.

I claim:

1. A method of altering growth characteristics of plants which comprises wetting at least a portion of the plant structure with an aqueous composition containing a wetting agent and 0.002% to 5% by weight of a compound having the formula

where R is selected from the class consisting of the hydrogen atom and an aliphatic hydrocarbon radical, A is an atom selected from the class consisting of oxygen and sulfur atoms, and Y is a member selected from the class consisting of the hydroxy radical, an oxy hydrocarbon radical, the amido radical, a hydrocarbon substituted amido radical, an oxy ammonium group, and an oxymetallic group.

2. A method of altering the growth characteristics of plants which comprises wetting at least a portion of the plant structure with an aqueous composition containing a wetting agent and 0.002% to 5% by weight of an S-aliphatic hydrocarbon beta-mercaptopropionic acid.

3. A method of altering the growth characteristics of plants which comprises wetting at least a portion of the plant structure with an aqueous composition containing a wetting agent and 0.002% to 5% by weight of a beta-aliphatic hydrocarbon-oxy-propionic acid.

4. A method of altering the growth characteristics of plants which comprises wetting at least a portion of the plant structure with an aqueous composition containing a wetting agent and 0.002% to 5% by weight of a beta-alkoxy propionic acid.

5. A method of altering the growth characteristics of plants which comprises wetting at least a portion of the plant structure with an aqueous composition containing a wetting agent and 0.002% to 5% by weight of a beta-alkenoxy propionic acid.

6. A method of altering the growth characteristics of plants which comprises wetting at least a portion of the plant structure with an aqueous composition containing a wetting agent and 0.002% to 5% by weight of S-n-octyl-beta mercaptopropionic acid.

7. A method of altering the growth characteristics of plants which comprises wetting at least a portion of the plant structure with an aqueous composition containing a wetting agent and 0.002% to 5% by weight of beta-ethoxy-propionic acid.

8. A method of altering the growth characteristics of plants which comprises wetting at least a portion of the plant structure with an aqueous composition containing a wetting agent and 0.002% to 5% by weight of beta-methallyloxy-propionic acid.

9. A method of initiating root growth on plant cuttings which comprises wetting the cutting with an aqueous composition containing a wetting agent and 0.002% to 1.0% by weight of S-n-octyl-beta-mercapto-propionic acid and then maintaining the cutting so treated under conditions favoring root growth.

10. A method of initiating root growth on plant cuttings which comprises wetting the cutting with an aqueous composition containing a wetting agent and 0.002% to 1.0% by weight of beta-ethoxypropionic acid and maintaining the cutting so treated under conditions favoring root growth.

11. A method of initiating root growth on plant cuttings which comprises wetting the cutting with an aqueous composition containing a wetting agent and 0.002% to 1.0% by weight of beta-methallyloxy-propionic acid and maintaining the cutting so treated under conditions favoring root growth.

WILLIAM D. STEWART.

REFERENCES CITED

The following references are of record in the file of this patent:

UNITED STATES PATENTS

| Number | Name | Date |
|---|---|---|
| 2,287,537 | Schulz | June 23, 1943 |
| 2,326,471 | Lontz | Aug. 10, 1943 |
| 2,352,641 | Kling | July 4, 1944 |
| 2,397,960 | Gribbins et al. | Apr. 9, 1946 |
| 2,416,198 | Moyer | Feb. 18, 1947 |
| 2,416,052 | Gribbins | Feb. 18, 1947 |